(12) United States Patent
Hunt et al.

(10) Patent No.: US 8,986,812 B2
(45) Date of Patent: Mar. 24, 2015

(54) THIN MICROSTRUCTURED OPTICAL FILMS

(75) Inventors: Bryan V. Hunt, Fridley, MN (US); Judith M. Invie, Woodbury, MN (US); Anthony M. Renstrom, Oakdale, MN (US); David B. Olson, Marine on St. Croix, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 450 days.

(21) Appl. No.: 11/774,976

(22) Filed: Jul. 9, 2007

(65) Prior Publication Data

US 2009/0017256 A1  Jan. 15, 2009

(51) Int. Cl.
| | |
|---|---|
| B32B 27/00 | (2006.01) |
| B32B 33/00 | (2006.01) |
| C09D 4/06 | (2006.01) |
| C08L 33/14 | (2006.01) |
| F21V 8/00 | (2006.01) |
| C08F 290/06 | (2006.01) |
| G02B 1/04 | (2006.01) |

(52) U.S. Cl.
CPC . *C09D 4/06* (2013.01); *C08L 33/14* (2013.01); *G02B 6/0053* (2013.01); *C08F 290/06* (2013.01); *G02B 1/04* (2013.01)
USPC ............ 428/141; 362/339; 428/335; 428/336

(58) Field of Classification Search
CPC .......... C08F 290/06; C09D 4/06; G02B 1/04; G02B 6/0053; C08L 33/14
USPC ............................ 362/339; 428/141, 335, 336
See application file for complete search history.

(56) References Cited

U.S. PATENT DOCUMENTS

| | | | | |
|---|---|---|---|---|
| 4,166 A | * | 8/1845 | Olson et al. .................. | 472/123 |
| 119,583 A | * | 10/1871 | Jones et al. ..................... | 450/7 |
| 221,291 A | * | 11/1879 | Invie et al. .................... | 607/147 |
| 4,518,756 A | | 5/1985 | Yoshida et al. | |
| 5,453,452 A | | 9/1995 | Nakayama et al. | |
| 5,629,445 A | | 5/1997 | Nakayama et al. | |
| 5,932,626 A | * | 8/1999 | Fong et al. .................... | 522/182 |
| 5,969,867 A | * | 10/1999 | Fukushima et al. .......... | 359/581 |
| 7,087,659 B2 | | 8/2006 | Chisholm et al. | |
| 7,282,272 B2 | * | 10/2007 | Jones et al. ................... | 428/500 |
| 2005/0049325 A1 | | 3/2005 | Chisholm et al. | |
| 2005/0200278 A1 | * | 9/2005 | Jones et al. ................... | 313/582 |
| 2006/0004166 A1 | | 1/2006 | Olson et al. | |
| 2006/0077322 A1 | * | 4/2006 | Chuang et al. ................ | 349/113 |
| 2007/0112097 A1 | | 5/2007 | Olson et al. | |
| 2008/0119583 A1 | | 5/2008 | Jones et al. | |
| 2008/0221291 A1 | | 9/2008 | Invie et al. | |

FOREIGN PATENT DOCUMENTS

| | | |
|---|---|---|
| EP | 0156430 | 10/1985 |
| EP | 0759448 | 2/1997 |
| JP | 7-316245 | 12/1995 |
| JP | 9-272707 | 10/1997 |
| JP | 2002-187920 | 7/2002 |
| JP | 2002-212514 | 7/2002 |
| JP | 3397448 | 4/2003 |
| JP | 2004-323557 | 11/2004 |
| JP | 2005-272773 | 10/2005 |
| WO | WO 01/94430 | 12/2001 |
| WO | WO 2005/066230 | 7/2005 |
| WO | WO 2006/028543 | 3/2006 |

OTHER PUBLICATIONS

Sartomer Co. Material Safety Data Sheet, CN112C60, Sartomer Company, Revised Date Aug. 1, 2005.*
Sartomer, Material Safety Data Sheet, SR 601, Sartomer Company, Revised date Feb. 22, 2007.*
Sartomer, Material Safety Sheet, SR339, Sartomer Company, Revised date Jan. 8, 2009.*
Sartomer, Technical Data Sheet, CN 120, Sartomer Company. No date.*
CIBA, Liquid Photoinitiator for Ultraviolet Curing of Coatings, Darocur 1173, CIBA. No date.*
http://www.hz-flying.com/notify-NotifyUser_NONE_coach?aHR0cDovL3d3dy5oei1mbHlpbmcuY29tL2VucHJvZGV0YWlsLmFzcHg/aWQ9MzM2 (Obtained Oct. 5, 2012).*
Jarchem Industries Inc. Brochure, Specialty Monomers (2004) pp. 1-11.
U.S. Appl. No. 13/958,996, filed Aug. 5, 2013.

* cited by examiner

*Primary Examiner* — Gerard Higgins
*Assistant Examiner* — Sathavaram I Reddy
(74) *Attorney, Agent, or Firm* — Carolyn A. Fischer

(57) ABSTRACT

Presently described are optical films, such as a brightness enhancing film, having a polymerized microstructured surface disposed on a preformed polymeric film wherein the film has a thickness of no greater than 3 mils and the polymerized microstructured surface consists of the reaction product of a substantially non-brominated polymerizable resin composition.

11 Claims, No Drawings

THIN MICROSTRUCTURED OPTICAL FILMS

BACKGROUND

Certain microreplicated optical products, such as described in U.S. Pat. Nos. 5,175,030 and 5,183,597, are commonly referred to as a "brightness enhancing films".

Brightness enhancing films are currently used in various (e.g. LCD) hand-held display devices, such as cell phones, PDAs, and MP3 players, to increase battery life and display brightness. An industry trend, particularly for hand-held display devices, is to produce increasingly thinner devices.

Brightness enhancing films have been prepared from high index of refraction polymerizable compositions. As described in Lu et al., U.S. Pat. No. 5,175,030, and Lu, U.S. Pat. No. 5,183,597, a microstructure-bearing article (e.g. brightness enhancing film) can be prepared by a method including the steps of (a) preparing a polymerizable composition; (b) depositing the polymerizable composition onto a master negative microstructured molding surface in an amount barely sufficient to fill the cavities of the master; (c) filling the cavities by moving a bead of the polymerizable composition between a preformed base (such as a PET film) and the master, at least one of which is flexible; and (d) curing the composition.

SUMMARY

The Applicant has found that polymerizable resin compositions that are suitable for "thicker" brightness enhancing films, such as those prepared from casting and curing prism microstructures on a preformed (e.g. PET) film having a thickness of 5 mils or greater, are unsuitable when cast and cured upon thinner preformed films.

It has been found that certain polymerizable resins can result in the brightness enhancing film exhibiting undesirable "curl" which makes small pieces of the film difficult to handle during assembly and can prohibit the film from lying flat in the assembled (e.g. hand-held) device.

Presently described are optical films, such as a brightness enhancing film, having a polymerized microstructured surface disposed on a preformed polymeric film wherein the film has a thickness of no greater than 3 mils and the polymerized microstructured surface consists of the reaction product of a substantially non-brominated polymerizable resin composition comprising
i) at least 60 wt-% of one or more bisphenol di(meth)acrylate monomers, aromatic epoxy di(meth)acrylate oligomers, or mixtures thereof, and
ii) about 5 wt-% to about 40 wt-% of an (meth)acrylate diluent having a viscosity of less than 300 cps at 25° C.; wherein the polymerizable composition comprises 0 to 15 wt-% of components comprising three or more (meth)acrylate groups.

In view of the selection of the polymerizable resin composition, such thin optical films exhibit low curl (e.g. 0-2 mm).

DETAILED DESCRIPTION OF PREFERRED EMBODIMENTS

Presently described are polymerizable resin compositions for use in making microstructured optical film articles, especially brightness enhancing films. The optical films comprise a polymerized structure prepared from the reaction product of polymerizable resin composition.

Brightness enhancing films generally enhance on-axis luminance (referred herein as "brightness") of a lighting device. Brightness enhancing films can be light transmissible, microstructured films. The microstructured topography can be a plurality of prisms on the film surface such that the films can be used to redirect light through reflection and refraction. The height of the prisms typically ranges from about 1 to about 75 microns. When used in an optical display such as that found in laptop computers, watches, etc., the microstructured optical film can increase brightness of an optical display by limiting light escaping from the display to within a pair of planes disposed at desired angles from a normal axis running through the optical display. As a result, light that would exit the display outside of the allowable range is reflected back into the display where a portion of it can be "recycled" and returned back to the microstructured film at an angle that allows it to escape from the display. The recycling is useful because it can reduce power consumption needed to provide a display with a desired level of brightness.

The brightness enhancing film of the invention generally comprises a (e.g. preformed polymeric film) base layer and an optical layer. The optical layer comprises a linear array of regular right prisms. Each prism has a first facet and a second facet. The prisms are formed on base that has a first surface on which the prisms are formed and a second surface that is substantially flat or planar and opposite first surface. By right prisms it is meant that the apex angle is typically about 90°. However, this angle can range from 70° to 120° and may range from 80° to 100°. These apexes can be sharp, rounded or flattened or truncated. For example, the ridges can be rounded to a radius in a range of 4 to 7 to 15 micrometers. The spacing between prism peaks (or pitch) can be 5 to 300 microns. For thin brightness enhancing films, the pitch is preferably 10 to 36 microns, and more preferably 18 to 24 microns. This corresponds to prism heights of preferably about 5 to 18 microns, and more preferably about 9 to 12 microns. The prism facets need not be identical, and the prisms may be tilted with respect to each other. The relationship between the total thickness of the optical article, and the height of the prisms, may vary. However, it is typically desirable to use relatively thinner optical layers with well-defined prism facets. For thin brightness enhancing films on substrates with thicknesses close to 1 mil (20-35 microns), a typical ratio of prism height to total thickness is generally between 0.2 and 0.4.

As described in U.S. Pat. No. 5,183,597 (Lu) and U.S. Pat. No. 5,175,030 (Lu et al.), a microstructure-bearing article (e.g. brightness enhancing film) can be prepared by a casting and curing method. Such method includes the steps of filling the (e.g. microprismatic) cavities of a master negative microstructured molding surface and curing the composition between a preformed (e.g. optically transparent) base and the master. The master can be metallic, such as nickel, nickel-plated copper or brass, or can be a thermoplastic material that is stable under the polymerization conditions, and that preferably has a surface energy that allows clean removal of the polymerized material from the master. One or more the surfaces of the base film can optionally be primed or otherwise be treated to promote adhesion of the optical layer to the base. The microstructured optical layer can have a variety of useful patterns such as described and shown in U.S. Pat. No. 7,074,463; incorporated herein by reference. These include regular or irregular prismatic patterns can be an annular prismatic pattern, a cube-corner pattern or any other lenticular microstructure. A useful microstructure is a regular prismatic pattern that can act as a totally internal reflecting film for use as a brightness enhancement film. Another useful microstructure is a corner-cube prismatic pattern that can act as a retroreflecting film or element for use as reflecting film. Another useful microstructure is a prismatic pattern that can act as an optical turning film or element for use in an optical display.

The preformed polymeric film of the base layer can be of a nature and composition suitable for use in an optical product, i.e. a product designed to control the flow of light. Various materials can be used as a base material as long as the material is sufficiently optically clear and structurally strong enough to be assembled into or used within a particular optical product. A base material can be chosen that has sufficient resistance to temperature and aging that performance of the optical product is not compromised over time.

Useful polymeric film materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polycyclo-olefins, and polyimides. Optionally, the base material can contain mixtures or combinations of these materials. In an embodiment, the base may be multi-layered or may contain a dispersed component suspended or dispersed in a continuous phase.

For some optical products such as brightness enhancement films, preferred preformed polymeric films include polyethylene terephthalate (PET) and polycarbonate. Examples of useful PET films include photograde polyethylene terephthalate and MELINEX™ PET available from DuPont Films of Wilmington, Del.

Some preformed film materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 and 5,783,120. The use of these polarizer films in combination with a brightness enhancement film has been described in U.S. Pat. No. 6,111,696. A second example of a polarizing film that can be used as a base are those films described in U.S. Pat. No. 5,882,774. Films available commercially are the multilayer films sold under the trade designation DBEF (Dual Brightness Enhancement Film) from 3M. The use of such multilayer polarizing optical film in a brightness enhancement film has been described in U.S. Pat. No. 5,828,488.

The presently described (e.g. brightness enhancing) microstructured optical film articles comprise a preformed polymeric film base layer having a thickness of no greater than about 3 mils. The preformed polymeric film typically has a thickness of at least 0.5 mils (e.g. 0.6 mils, 0.7 mils, 0.8 mils, 0.9 mils). In some embodiments, the film thickness ranges from about 1 mil to 2 mils.

The polymerizable resin compositions described herein are non-brominated, meaning that the polymerizable components utilized do not comprise bromine substituents. In some embodiments, the polymerizable resin compositions are non-halogenated. However, a detectable amount, i.e. less than 1 wt-% (as measured according to Ion Chromatography) of (e.g. bromine) halogen may be present as a contaminant.

The inclusion of high concentration of nanoparticles typically alters the concentrations of the organic components of the polymerizable resin composition. Accordingly, the polymerizable composition resin compositions described herein generally comprises less than 10 wt-% or are substantially free of inorganic nanoparticles.

The polymerizable compositions described herein are preferably substantially solvent free. "Substantially solvent free" refer to the polymerizable composition having less than 5 wt-%, 4 wt-%, 3 wt-%, 2 wt-%, 1 wt-% and 0.5 wt-% of (e.g. organic) solvent. The concentration of solvent can be determined by known methods, such as gas chromatography. Solvent concentrations of less than 0.5 wt-% are preferred.

The components of the polymerizable resin composition are preferably chosen such that the composition has a low viscosity at the coating temperature. The viscosity of the polymerizable resin composition is less than 1000 cps and typically less than 900 cps. The viscosity of the organic component may be less than 800 cps, less than 700 cps, less than 600 cps, or less than 500 cps at the coating temperature. As used herein, viscosity is measured (e.g. at a shear rate of about 4 to 20 sec-1) with a Brookfield Viscometer. Further, the viscosity of the polymerizable resin composition at the coating temperature is typically at least 10 cps, at least 50 cps, or at least 100 cps.

The coating temperature typically ranges from ambient temperature, (i.e. 25° C.) to 180° F. (82° C.). The coating temperature may be less than 170° F. (77° C.), less than 160° F. (71° C.), less than 150° F. (66° C.), less than 140° F. (60° C.), less than 130° F. (54° C.), or less than 120° F. (49° C.). The polymerizable resin composition can comprise a solid component provided that the melting point in the polymerizable composition is less than the coating temperature. However, the components of the polymerizable resin composition are preferably liquids at ambient temperature.

The polymerizable resin composition has refractive index of at least 1.47, for most product applications; whereas the polymerizable resin composition of a turning film may have a refractive index as low as 1.44. The refractive index of the polymerizable composition may be at least 1.48, 1.49, 1.50, 1.51, 1.52, 1.53, 1.54, 1.55, 1.56, 1.57, 1.58, 1.59, or 1.60. High transmittance in the visible light spectrum is also typically preferred.

The polymerizable composition is energy curable in time scales preferably less than five minutes (e.g. for a brightness enhancing film having a 75 micron thickness). The polymerizable composition is preferably sufficiently crosslinked to provide a glass transition temperature that is typically greater than 45° C. The glass transition temperature can be measured by methods known in the art, such as Differential Scanning Calorimetry (DSC), modulated DSC, or Dynamic Mechanical Analysis. The polymerizable composition can be polymerized by conventional free radical polymerization methods.

The polymerizable resin comprises a mixture of ethylenically unsaturated components. The mixture includes a major amount of at least one difunctional aromatic (meth)acrylate monomer or oligomer and at least one (meth)acrylate diluent. The (meth)acrylate diluent has a lower molecular weight and thus a substantially lower viscosity than that of the di(meth) acrylate component, i.e. less than 300 cps at 25° C. In some embodiments, the viscosity of the (meth)acrylate diluent is less than 250 cps, 200 cps, 150 cps, 100 cps, or 50 cps at 25°

C. The inclusion of one or more (meth)acrylate diluents improves the processability by reducing the viscosity of the polymerizable resin composition allowing for faster filling of the cavities of the microstructured tool.

In some embodiments, the aromatic monomer is a bisphenol di(meth)acrylate, i.e. the reaction product of a bisphenol A diglycidyl ether and acrylic acid. Although, bisphenol A is most widely available, it is appreciated that other bisphenol diglycidyl ethers, such as bisphenol F digycidyl could also be used. In other embodiments, the monomer is an aromatic epoxy di(meth)acrylate oligomer derived from a different starting monomer.

Regardless of the starting monomers, the polymerizable composition preferably comprises at least one aromatic difunctional (meth)acrylate monomer that comprises a major portion having the following general structure:

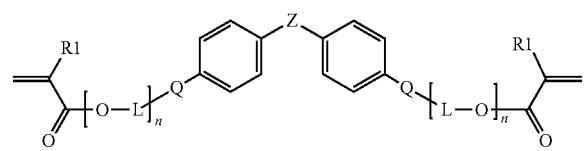

wherein Z is independently —C(CH$_3$)$_2$—, —CH$_2$—, —C(O)—, —S—, —S(O)—, or —S(O)$_2$—, each Q is independently O or S. L is a linking group. L may independently comprise a branched or linear C$_2$-C$_6$ alkyl group and n ranges from 0 to 10. More preferably L is C$_2$ or C$_3$ and n is 0, 1, 2 or 3. The carbon chain of the alkyl linking group may optionally be substituted with one or more hydroxy groups. For example L may be —CH$_2$CH(OH)CH$_2$-Typically, the linking groups are the same. R1 is independently hydrogen or methyl.

The di(meth)acrylate monomer may be synthesized or purchased. As used herein, major portion refers to at least 60-75 wt-% of the monomer containing the specific structure(s) just described. It is commonly appreciated that other reaction products are also typically present as a byproduct of the synthesis of such monomers.

Preferred di(meth)acrylate aromatic epoxy oligomers and bisphenol A di(meth)acrylate monomers, described herein, have a molecular weight (i.e. the calculated molecular weight of the major molecule) greater than 450 g/mole. Typically the molecular weight is less than 1600 g/mole.

The polymerizable resin composition comprises one or more of such monomers in an amount of at least 60 wt-%. Accordingly, the polymerizable resin composition may comprise a single bisphenol A di(meth)acrylate monomer, two or more bisphenol A di(meth)acrylate monomer(s), a single aromatic epoxy di(meth)acrylate oligomer, two or more aromatic epoxy di(meth)acrylate oligomers, as well as various combinations of at least one bisphenol A di(meth)acrylate in combination with at least one aromatic epoxy di(meth)acrylate.

In some embodiments, the polymerizable resin composition comprises at least 65 wt-% (66 wt-%, 67 wt-%, 68 wt-%, 69 wt-%), at least 70 wt-% (71 wt-%, 72 wt-%, 73 wt-%, 74 wt-%), or at least 75 wt-% of such di(meth)acrylate) monomer(s) and/or oligomer(s).

Various (meth)acrylated aromatic epoxy oligomers are commercially available. For example, (meth)acrylated aromatic epoxy, (described as a modified epoxy acrylates), are available from Sartomer, Exton, Pa. under the trade designation "CN118", and "CN115". (Meth)acrylated aromatic epoxy oligomer, (described as an epoxy acrylate oligomer), is available from Sartomer under the trade designation "CN2204". Further, a (meth)acrylated aromatic epoxy oligomer, (described as an epoxy novolak acrylate blended with 40% trimethylolpropane triacrylate), is available from Sartomer under the trade designation "CN112C60". One exemplary aromatic epoxy acrylate is commercially available from Sartomer under the trade designation "CN 120" (reported by the supplier to have a refractive index of 1.5556, a viscosity of 2150 at 65° C., and a Tg of 60° C.).

One exemplary bisphenol A ethoxylated diacrylate monomer is commercially available from Sartomer under the trade designations "SR602" (reported to have a viscosity of 610 cps at 20° C. and a Tg of 2° C.). Another exemplary bisphenol A ethoxylated diacrylate monomer is as commercially available from Sartomer under the trade designation "SR601" (reported to have a viscosity of 1080 cps at 20° C. and a Tg of 60° C.).

The total amount of (meth)acrylate diluent(s) can be at least 5 wt-%, 10 wt-%, 15 wt-%, 20 wt-%, or 25 wt-% of the polymerizable composition. The total amount of (meth)acrylate diluents(s) is typically no greater than 40 wt-%, and more typically no greater than about 35 wt-%.

In some embodiments, a multi-functional (meth)acrylate component may be employed as a diluent. For example, tetraethylene glycol diacrylate such as commercially available from Sartomer under the trade designation SR 268 has been found to be a suitable diluent. Other suitable multi-functional diluents include SR351, trimethylol propane triacrylate (TMPTA).

When one or more aromatic (e.g. monofunctional) (meth)acrylate monomer(s) are employed as the diluent, such diluent can concurrently raise the refractive index of the polymerizable resin composition. Suitable aromatic monofunctional (meth)acrylate monomers typically have a refractive index of at least 1.50, 1.51, 1.52, 1.53, 1.54, 1.55, 1.56, 1.57 or 1.58.

Aromatic (e.g. monofunctional) (meth)acrylate monomers typically comprise a phenyl, biphenyl, cumyl, or napthyl group.

Suitable monomers include phenoxyethyl(meth)acrylate; phenoxy-2-methylethyl (meth)acrylate; phenoxyethoxyethyl (meth)acrylate, 3-hydroxy-2-hydroxypropyl (meth)acrylate; benzyl(meth)acrylate; phenylthio ethyl acrylate; 2-naphthylthio ethyl acrylate; 1-naphthylthio ethyl acrylate; naphthyloxy ethyl acrylate; 2-naphthyloxy ethyl acrylate; phenoxy 2-methylethyl acrylate; phenoxyethoxyethyl acrylate; 3-phenoxy-2-hydroxy propyl acrylate; and phenyl acrylate.

Phenoxyethyl acrylate is commercially available from more than one source including from Sartomer under the trade designation "SR339"; from Eternal Chemical Co. Ltd. under the trade designation "Etermer 210"; and from Toagosei Co. Ltd under the trade designation "TO-1166". Phenylthio ethyl acrylate (PTEA) is also commercially available from Cognis. The structure of these monomers is shown as follows:

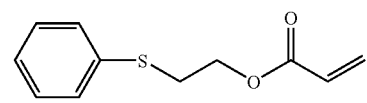

PTEA

PEA

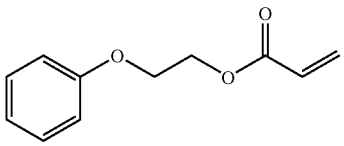

In some embodiments, the polymerizable compositions comprise one or more monofunctional biphenyl monomer(s).

Monofunctional biphenyl monomers comprise a terminal biphenyl group (wherein the two phenyl groups are not fused, but joined by a bond) or a terminal group comprising two aromatic groups joined by a linking group (e.g. Q). For example, when the linking group is methane, the terminal group is a biphenylmethane group. Alternatively, wherein the linking group is —(C(CH$_3$)$_2$—, the terminal group is 4-cumyl phenyl. The monofunctional biphenyl monomer(s) also comprise a single ethylenically unsaturated group that is preferably polymerizable by exposure to (e.g. UV) radiation. The monofunctional biphenyl monomer(s) preferably comprise a single (meth)acrylate group or single thio(meth)acrylate group. Acrylate functionality is typically preferred. In some aspects, the biphenyl group is joined directly to the ethylenically unsaturated (e.g. (meth)acrylate) group. An exemplary monomer of this type is 2-phenyl-phenyl acrylate. The biphenyl mono(meth)acrylate or biphenyl thio(meth)acrylate monomer may further comprise a (e.g. 1 to 5 carbon) alkyl group optionally substituted with one or more hydroxyl groups. An exemplary species of this type is 2-phenyl-2-phenoxyethyl acrylate.

In one embodiment, a monofunctional biphenyl(meth)acrylate monomer is employed having the general formula:

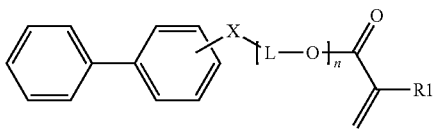

wherein R1 is H or CH$_3$;
X is O or S;
n ranges from 0 to 10 (e.g. n is 1, 2, 3, 4, 5, 6, 7, 8, 9, or 10); and
L is an alkyl group having 1 to 5 carbon atoms (i.e. methyl, ethyl, propyl, butyl, or pentyl), optionally substituted with hydroxy.

In another embodiment, the monofunctional biphenyl (meth)acrylate monomer has the general formula:

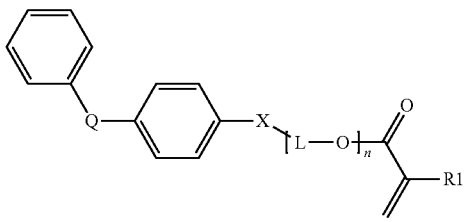

wherein R1 is H or CH$_3$;
X is O or S;
Q is selected from —(C(CH$_3$)$_2$—, —CH$_2$, —C(O)—, —S(O)—, and —S(O)$_2$—;
n ranges from 0 to 10 (e.g. n is 1, 2, 3, 4, 5, 6, 7, 8, 9, or 10); and L is an alkyl group having 1 to 5 carbon atoms (i.e. methyl, ethyl, butyl, or pentyl), optionally substituted with hydroxy.

Some specific monomers that are commercially available from Toagosei Co. Ltd. of Japan, include for example 2-phenyl-phenyl acrylate available under the trade designation "TO-2344", 4-(-2-phenyl-2-propyl)phenyl acrylate available under the trade designation "TO-2345", ethoxylated p-cumylphenol acrylate available under the trade designation "M-110", and 2-phenyl-2-phenoxyethyl acrylate, available under the trade designation "TO-1463".

Various combinations of aromatic monofunctional (meth) acrylate monomers can be employed. For example, a (meth) acrylate monomer comprising a phenyl group may be employed in combination with one or more (meth)acrylate monomers comprising a biphenyl group. Further, two different biphenyl(meth)acrylate monomer may be employed.

The polymerizable resin may optionally comprise up to 35 wt-% of various other non-brominated or non-halogenated ethylenically unsaturated monomers. For example, when the (e.g. prism) structures are cast and photocured upon a polycarbonate preformed polymeric film the polymerizable resin composition may comprise one or more N,N-disubstituted (meth)acrylamide monomers. These include N-alkylacrylamides and N,N-dialkylacrylamides, especially those containing C$_{1-4}$ alkyl groups. Examples are N-isopropylacrylamide, N-t-butylacrylamide, N,N-dimethylacrylamide, N,N-diethylacrylamide, N-vinyl pyrrolidone and N-vinyl caprolactam.

The polymerizable resin composition may also optionally comprise up to 15 wt-% of a non-aromatic crosslinker that comprises at least three (meth)acrylate groups. Suitable crosslinking agents include for example pentaerythritol tri (meth)acrylate, pentaerythritol tetra(meth)acrylate, trimethylolpropane tri(methacrylate), dipentaerythritol penta(meth) acrylate, dipentaerythritol hexa(meth)acrylate, trimethylolpropane ethoxylate tri(meth)acrylate, glyceryl tri (meth)acrylate, pentaerythritol propoxylate tri(meth)acrylate, and ditrimethylolpropane tetra(meth)acrylate. Any one or combination of crosslinking agents may be employed. Since methacrylate groups tend to be less reactive than acrylate groups, the crosslinker(s) are preferably free of methacrylate functionality.

Various crosslinkers are commercially available. For example, pentaerythritol triacrylate (PETA) is commercially available from Sartomer Company, Exton, Pa. under the trade designation "SR444"; from Osaka Organic Chemical Industry, Ltd. Osaka, Japan under the trade designation "Viscoat #300"; from Toagosei Co. Ltd., Tokyo, Japan under the trade designation "Aronix M-305"; and from Eternal Chemical Co., Ltd., Kaohsiung, Taiwan under the trade designation "Etermer 235". Trimethylol propane triacrylate (TMPTA) is commercially available from Sartomer Company under the trade designations "SR351". TMPTA is also available from Toagosei Co. Ltd. under the trade designation "Aronix M-309". Further, ethoxylated trimethylolpropane triacrylate and ethoxylated pentaerythritol triacrylate are commercially available from Sartomer under the trade designations "SR454" and "SR494" respectively.

It is typically preferred, however, that the composition is substantially free (e.g. less than 1-2 wt-%) of (meth)acrylate monomer and oligomers that comprise three of more (meth) acrylate groups.

The UV curable polymerizable compositions comprise at least one photoinitiator. A single photoinitiator or blends thereof may be employed in the brightness enhancement film of the invention. In general the photoinitiator(s) are at least partially soluble (e.g. at the processing temperature of the resin) and substantially colorless after being polymerized. The photoinitiator may be (e.g. yellow) colored, provided that the photoinitiator is rendered substantially colorless after exposure to the UV light source.

Suitable photoinitiators include monoacylphosphine oxide and bisacylphosphine oxide. Commercially available mono or bisacylphosphine oxide photoinitiators include 2,4,6-trimethylbenzoylbiphenylphosphine oxide, commercially available from BASF (Charlotte, N.C.) under the trade designation "Lucirin TPO"; ethyl-2,4,6-trimethylbenzoylphenyl phosphinate, also commercially available from BASF under the trade designation "Lucirin TPO-L"; and bis(2,4,6-trimethylbenzoyl)-phenylphosphine oxide commercially available from Ciba Specialty Chemicals under the trade designation "Irgacure 819". Other suitable photoinitiators include 2-hydroxy-2-methyl-1-phenyl-propan-1-one, commercially available from Ciba Specialty Chemicals under the trade designation "Darocur 1173" as well as other photoinitiators commercially available from Ciba Specialty Chemicals under the trade designations "Darocur 4265", "Irgacure 651", "Irgacure 1800", "Irgacure 369", "Irgacure 1700", and "Irgacure 907".

The photoinitiator can be used at a concentration of about 0.1 to about 10 weight percent. More preferably, the photoinitiator is used at a concentration of about 0.5 to about 5 wt-%. Greater than 5 wt-% is generally disadvantageous in view of the tendency to cause yellow discoloration of the brightness enhancing film. Other photoinitiators and photoinitiator may also suitably be employed as may be determined by one of ordinary skill in the art.

Surfactants such as fluorosurfactants and silicone based surfactants can optionally be included in the polymerizable composition to reduce surface tension, improve wetting, allow smoother coating and fewer defects of the coating, etc.

For the following defined terms, these definitions shall be applied, unless a different definition is given in the claims or elsewhere in this specification.

"Microstructure" is used herein as defined and explained in U.S. Pat. No. 4,576,850. Thus, it means the configuration of a surface that depicts or characterizes the predetermined desired utilitarian purpose or function of the article having the microstructure. Discontinuities such as projections and indentations in the surface of said article will deviate in profile from the average center line drawn through the microstructure such that the sum of the areas embraced by the surface profile above the center line is equal to the sum of the areas below the line, said line being essentially parallel to the nominal surface (bearing the microstructure) of the article. The heights of said deviations will typically be about +/−0.005 to +/−750 microns, as measured by an optical or electron microscope, through a representative characteristic length of the surface, e.g., 1-30 cm. Said average center line can be piano, concave, convex, aspheric or combinations thereof. Articles where said deviations are of low order, e.g., from +/−0.005+/−0.1 or, preferably, +/−0.05 microns, and said deviations are of infrequent or minimal occurrence, i.e., the surface is free of any significant discontinuities, are those where the microstructure-bearing surface is an essentially "flat" or "smooth" surface, such articles being useful, for example, as precision optical elements or elements with a precision optical interface, such as ophthalmic lenses. Articles where said deviations are of low order and of frequent occurrence include those having anti-reflective microstructure. Articles where said deviations are of high-order, e.g., from +/−0.1 to +/−750 microns, and attributable to microstructure comprising a plurality of utilitarian discontinuities which are the same or different and spaced apart or contiguous in a random or ordered manner, are articles such as retroreflective prismatic sheeting, microstructured molds (e.g. for molding paste to prepare barrier ribs), linear Fresnel lenses, video discs, light-collimating privacy films, and brightness enhancing films. The microstructure-bearing surface can contain utilitarian discontinuities of both said low and high orders. The microstructure-bearing surface may contain extraneous or non-utilitarian discontinuities so long as the amounts or types thereof do not significantly interfere with or adversely affect the predetermined desired utilities of said articles.

"Index of refraction," or "refractive index," refers to the absolute refractive index of a material (e.g., a monomer) that is understood to be the ratio of the speed of electromagnetic radiation in free space to the speed of the radiation in that material. The refractive index can be measured using known methods and is generally measured using a Bausch and Lomb Refractometer (CAT No. 33.46.10). It is generally appreciated that the measured index of refraction can vary to some extent depending on the instrument.

"(Meth)acrylate" refers to both acrylate and methacrylate compounds. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

Unless otherwise indicated, all numbers expressing quantities of ingredients, measurement of properties and so forth used in the specification and claims are to be understood as being modified in all instances by the term "about."

The present invention should not be considered limited to the particular examples described herein, but rather should be understood to cover all aspects of the invention as fairly set out in the attached claims. Various modifications, equivalent processes, as well as numerous structures to which the present invention can be applicable will be readily apparent to those of skill in the art to which the present invention is directed upon review of the instant specification.

EXAMPLES

Components of the Polymerizable Resin Compositions

| Generic Chemical Description | Supplier | Trade Designation |
|---|---|---|
| epoxy acrylate oligomer having a viscosity of 2150 at 65° C. and molecular weight of about 500 g/mole as reported by the supplier | Sartomer | CN-120 |
| ethoxylated bisphenol A diacrylate having a viscosity of 1080 at 65° C. molecular weight of about 512 g/mole as reported by the supplier | Sartomer | SR601 |
| tetra-bromo bisphenol A epoxy diacrylate (BEDA) | Cytec | RDX 51027 |
| biphenyl acrylate having a viscosity of 80-100 cp at 25° C. as reported by the supplier | ToaGosei | TO-2344 ("2344") |
| phenoxylethyl acrylate (PEA) having a viscosity of 12 cp at 25° C. as reported by the supplier | Sartomer | SR339 |
| trimethylolpropane triacrylate (TMPTA) having a viscosity of 106 cp at 25° C. as reported by the supplier | Sartomer | SR351 |
| tetraethylene glycol diacrylate | Sartomer | SR268 |
| a-hydroxyketone | Ciba | Darocur 1173 |
| mono acyl phosphine oxide | Ciba | Darocur TPO |
| 50/50 blend Darocur 1173/TPO | Ciba | Darocur 4265 |

The (meth)acrylate components used are believed to have a major amount of the following structures:

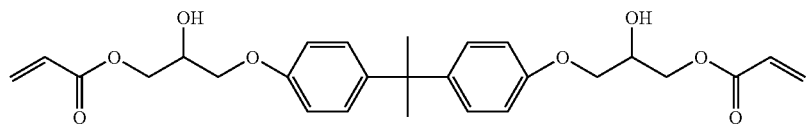

CN-120 (dimers and trimers are also present)

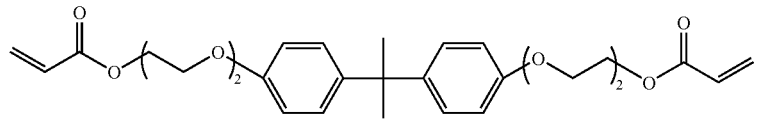

SR601

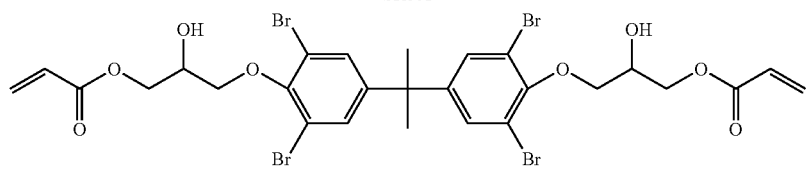

RDX 51027 (dimers and trimers are also present)

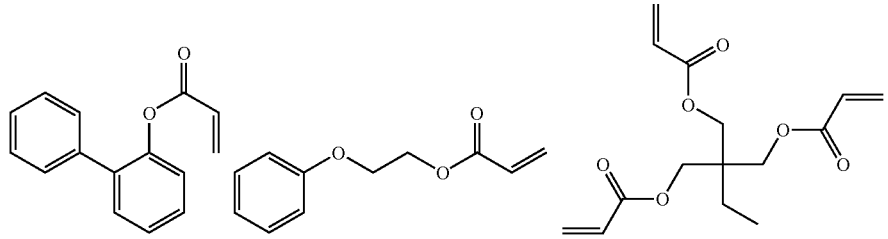

TO-2344        SR339        SR351

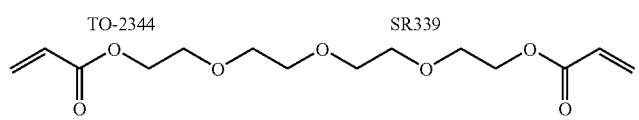

SR268

Polymerizable Resin Compositions:

Polymerizable Resin Compositions 1-12 were prepared by blending the monomers in the ratios specified below in Table 1 and then adding photoinitiator. To resins R1, R3, and R5 through R10, 0.3% of Darocur 4265 was added; to R2, 0.35% of Darocur 1173 and 0.1% of TPO was added; to R4, 0.6% Darocur 4265 was added; to R11, 0.3% of Darocur 4265 and 0.15% of Darocur 1173 was added; and to R12, 0.3% of TPO was added. In these compositions, the TMPTA has a viscosity of 106 cp at 25° C., thus is considered a triacrylate diluent component.

TABLE 1

| Resin | Description | Wt % Bis-A Diacrylate | Wt % Diluent | Wt % Triacrylate | Halogenated |
|---|---|---|---|---|---|
| R1 | 75/25 RDX-51027/PEA | 75 | 25 | 0 | Yes |
| R2 | 65/25/10 RDX-51027/PEA/TMPTA | 65 | 35 | 10 | Yes |
| R3 | 50/40/10 CN120/2344/TMPTA | 50 | 50 | 10 | No |
| R4 | 45/45/10 SR601/TO-2344/TMPTA | 45 | 55 | 10 | No |
| R5 | 60/20/20 CN120/2344/TMPTA | 60 | 40 | 20 | No |
| R6 | 60/40 CN120/PEA | 60 | 40 | 0 | No |
| R7 | 70/30 CN120/PEA | 70 | 30 | 0 | No |
| R8 | 75/25 CN120/PEA | 75 | 25 | 0 | No |
| R9 | 60/40 CN120/2344 | 60 | 40 | 0 | No |
| R10 | 50/20/30 CN120/SR601/TO-2344 | 70 | 30 | 0 | No |
| R11 | 65/25/10 CN120/PEA/TMPTA | 65 | 35 | 10 | No |

TABLE 1-continued

| Resin | Description | Wt % Bis-A Diacrylate | Wt % Diluent | Wt % Triacrylate | Halogenated |
|---|---|---|---|---|---|
| R12 | 64/10/18/8 CN120/SR601/ SR268/TMPTA | 74 | 26 | 8 | No |

Optical Film Sample Preparation:

Brightness enhancing films were independently prepared from each of the Polymerizable Resin Compositions of Table 1. An 8"×11" metal master consisting of linear rows of 90 degree prisms with a nominal pitch spacing of 24 microns, similar to the prism geometry pattern found on Vikuiti TBEF-90/24 (commercially available from 3M Co., St. Paul, Minn.), was placed on a hot plate and heated to 150° F. About 3 grams of warm resin was applied to either 5 mil, 2 mil, or 1 mil primed PET (polyester) film oriented so the linear prisms are oriented approximately perpendicular (90°+/−20°) to the machine direction of the film (i.e. parallel to the edge of the roll), and placed against the microstructured tool. The PET, polymerizable resin, and tool were passed through a heated laminator set at approximately 150° F. to create a uniformly thick sample. The tool containing the film and coated polymerizable resin sample was passed at 50 fpm through a Fusion UV Systems, Inc. Gaithersburg, Md. processor containing two 600 W/in D-bulbs.

Curl Test

Each brightness enhancing film produced was removed from the tool and cut into six 2" by 2" square parts (cut at a 45° bias to the prisms). The six parts were stacked and placed in a plastic bag. The bag for each sample was conditioned at 40° C. for 24 hours. After heating, the bags were conditioned at 22° C., 50% RH for 24 hours. In this environment (i.e. 22° C., 50% RH), the six samples were removed from the bags and placed on a flat surface, prism side up. Only the two corners along the length of the prisms lifted from the surface. Curl was measured as the average lift, in millimeters, of these two opposite corners off the surface. Table 2, as follows, depicts the cure test results of the optical films.

It is clear from the results in Table 2 that microstructured films prepared from R1, R2, R8, and R11 exhibited no curl when cast and cured upon a preformed polymeric (PET) film having a thickness of 5 mils substrate. Surprisingly, however, R1 and R2 exhibited substantial curl when cast and cured upon a 2 mil or 1 mil film. In view of these results, its is apparent that the magnitude of curl on a 5 mil film are not predictive of the magnitude of curl on thinner 2 mil and 1 mil films.

CN120 is compositionally very similar to RDX 51027 except that RDX 51027 comprises brominated substituents. By comparison of films prepared with R1 to those prepared with R8, it can be concluded that the presence of brominated substituents contributes to higher curl on thin preformed (PET) film. Non-halogenated polymerizable resin compositions R4, R5, and R6 share one or more of the common features of: having a relatively low concentration of diacrylate, i.e. less than 60 wt-%; or having a high concentration of crosslinker comprising at least three (meth)acrylate groups, i.e. greater than 15 wt-%; or having greater than 40 wt-% of a low viscosity diluent. But surprisingly, prism films microreplicated on thinner substrates have low curl when made from resin compositions comprising all three of the following features: at least 60 wt-% of a high MW non-brominated Bis-A diacrylate; 5-40 wt-% of a low viscosity diluent; and either excluding, or in some cases including less than 15% of a component having three or more (meth)acrylate groups. The samples with lowest curl either exclude a component having three or more (meth)acrylate groups, or included one at less than 10 wt-%.

TABLE 2

| Film Sample | Resin | Substrate | Curl (mm) |
|---|---|---|---|
| Comp-A | R1 | 5 mil | 0.0 |
| Comp-B | R2 | 5 mil | 0.0 |
| Comp-C | R8 | 5 mil | 0.0 |
| Comp-D | R11 | 5 mil | 0.0 |
| Comp-E | R1 | 2 mil | 2.3 |
| Comp-F | R2 | 2 mil | 3.2 |
| Comp-G | R3 | 2 mil | 2.2 |
| Comp-H | R4 | 2 mil | 3.3 |
| Comp-I | R1 | 1 mil | 4.7 |
| Comp-J | R2 | 1 mil | 5.8 |
| Comp-K | R5 | 1 mil | 4.3 |
| Ex-1 | R8 | 2 mil | 0.0 |
| Ex-2 | R10 | 2 mil | 0.0 |
| Ex-3 | R9 | 2 mil | 1.7 |
| Ex-4 | R12 | 2 mil | 0.0 |
| Ex-5 | R6 | 1 mil | 0.4 |
| Ex-6 | R7 | 1 mil | 0.1 |
| Ex-7 | R8 | 1 mil | 0.4 |
| Ex-8 | R10 | 1 mil | 0.7 |
| Ex-9 | R11 | 1 mil | 1.2 |

The gain of optical films of Table 2 was measured as follows:

Gain Test Method

Optical performance of each film was measured using a SpectraScan™ PR-650 SpectraColorimeter with an MS-75 lens, available from Photo Research, Inc, Chatsworth, Calif. The film was placed on top of a diffusely transmissive hollow light box. The diffuse transmission and reflection of the light box can be described as Lambertian. The light box was a six-sided hollow cube measuring approximately 12.5 cm×12.5 cm×11.5 cm (L×W×H) made from diffuse PTFE plates of ~6 mm thickness. One face of the box is chosen as the sample surface. The hollow light box had a diffuse reflectance of ~0.83 measured at the sample surface (e.g. ~83%, averaged over the 400-700 nm wavelength range, measurement method described below). During the gain test, the box is illuminated from within through a ~1 cm circular hole in the bottom of the box (opposite the sample surface, with the light directed towards the sample surface from the inside). This illumination is provided using a stabilized broadband incandescent light source attached to a fiber-optic bundle used to direct the light (Fostec DCR-II with ~1 cm diameter fiber bundle extension from Schott-Fostec LLC, Marlborough Mass. and Auburn, N.Y.). A standard linear absorbing polarizer (such as Melles Griot 03 FPG 007) is placed between the sample box and the camera. The camera is focused on the sample surface of the light box at a distance of ~34 cm and the absorbing polarizer is placed ~2.5 cm from the camera lens. The luminance of the illuminated light box, measured with the polarizer in place and no sample films, was >150 cd/m$^2$. The sample luminance is measured with the PR-650 at normal incidence to the plane of the box sample surface when the sample films are placed parallel to the box sample surface, the sample films being in general contact with the box. The relative single sheet gain is calculated by comparing this sample luminance to the luminance measured in the same manner from the light box alone. The entire measurement was carried out in a black enclosure to eliminate stray light sources. When the relative gain of film assemblies containing reflective polarizers was tested, the pass axis of the reflective polarizer was aligned with the pass axis of the absorbing polarizer of the test system. Relative gain values reported for prismatic films were generally obtained with the prism grooves of the film nearest the absorbing polarizer being aligned perpendicular to the pass axis of the absorbing polarizer.

The diffuse reflectance of the light box was measured using a 15.25 cm (6 inch) diameter Spectralon-coated integrating sphere, a stabilized broadband halogen light source, and a power supply for the light source all supplied by Labsphere (Sutton, N.H.). The integrating sphere had three opening ports, one port for the input light (of 2.5 cm diameter), one at 90 degrees along a second axis as the detector port (of 2.5 cm diameter), and the third at 90 degrees along a third axis (i.e. orthogonal to the first two axes) as the sample port (of 5 cm diameter). A PR-650 Spectracolorimeter (same as above) was focused on the detector port at a distance of ~38 cm. The reflective efficiency of the integrating sphere was calculated using a calibrated reflectance standard from Labsphere having ~99% diffuse reflectance (SRT-99-050). The standard was calibrated by Labsphere and traceable to a NIST standard (SRS-99-020-REFL-51). The reflective efficiency of the integrating sphere was calculated as follows:

Sphere brightness ratio=$1/(1-R\text{sphere}*R\text{standard})$

The sphere brightness ratio in this case is the ratio of the luminance measured at the detector port with the reference sample covering the sample port divided by the luminance measured at the detector port with no sample covering the sample port. Knowing this brightness ratio and the reflectance of the calibrated standard (Rstandard), the reflective efficiency of the integrating sphere, Rsphere, can be calculated. This value is then used again in a similar equation to measure a sample's reflectance, in this case the PTFE light box:

Sphere brightness ratio=$1/(1-R\text{sphere}*R\text{sample})$

Here the sphere brightness ratio is measured as the ratio of the luminance at the detector with the sample at the sample port divided by the luminance measured without the sample. Since Rsphere is known from above, Rsample can be calculated. These reflectances were calculated at 4 nm wavelength intervals and reported as averages over the 400-700 nm wavelength range.

For each of the brightness enhancing films tested an assembly was prepared by stacking two pieces of the same type of film. The prismatic microstructured surface of the bottom film was contacted with the base layer substrate of the top film such that the prisms of the bottom film were orthogonal with the prisms of the top film. The measured gain of this crossed sheet assembly was also measured.

The results in Table 3 show that the brightness enhancing films of Examples 1-4 have high gain values in addition to low curl. Also, the low curl Examples with the highest gain are those which exclude a component having three or more (meth)acrylate groups.

TABLE 3

| Film Sample | Resin | Substrate | Single Sheet Gain | Crossed Sheet Gain |
|---|---|---|---|---|
| Comp-E | R1 | 2 mil | 1.64 | 2.63 |
| Comp-F | R2 | 2 mil | 1.62 | 2.60 |
| Comp-G | R3 | 2 mil | 1.61 | 2.58 |
| Comp-H | R4 | 2 mil | 1.63 | 2.59 |
| Ex-1 | R8 | 2 mil | 1.60 | 2.54 |
| Ex-2 | R10 | 2 mil | 1.63 | 2.64 |
| Ex-3 | R9 | 2 mil | 1.64 | 2.63 |
| Ex-4 | R12 | 2 mil | 1.57 | 2.49 |

What is claimed is:

1. A brightness enhancing film having a polymerized microstructured surface comprising a plurality of prisms, disposed on a preformed polymeric polyethylene terephthalate film and the polymerized microstructured surface is a reaction product of a non-brominated polymerizable resin composition comprising i) at least about 60 wt-% of one or more bisphenol di(meth) acrylate monomers selected from the group consisting of

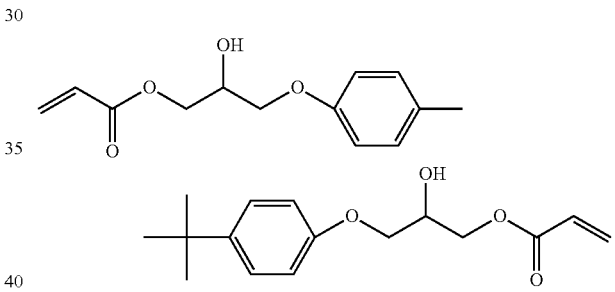

and a mixture of

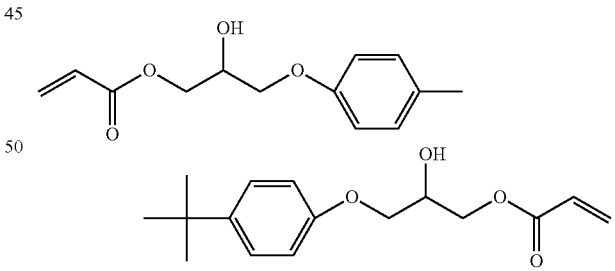

and

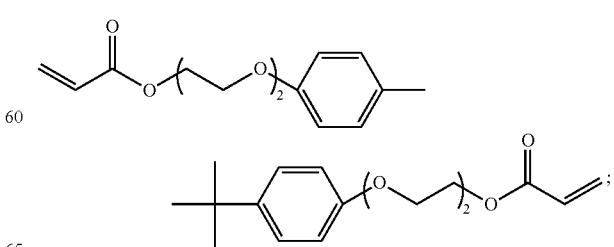

and ii) about 5 wt-% to about 40 wt-% of one or more (meth) acrylate diluents having a viscosity of less than 300 cps at 25° C. selected from the group consisting of phenoxy ethyl acrylate, 2-phenyl-phenyl acrylate, tetraethylene glycol diacrylate and mixtures thereof; wherein the non-brominated polymerizable composition comprises 0 to 15 wt-% of components comprising three or more (meth)acrylate groups; wherein the preformed polymeric polyethylene terephthalate film has a thickness of less than or equal to about 2 mils and the brightness enhancing film exhibits curl from 0 mm to less than 2 mm.

2. The brightness enhancing film of claim 1 wherein the non-brominated polymerizable resin comprises at least about 65 wt-% of one or more bisphenol di(meth)acrylate monomers.

3. The brightness enhancing film of claim 1 wherein the non-brominated polymerizable resin comprises at least about 70 wt-% of one or more bisphenol di(meth)acrylate monomers.

4. The brightness enhancing film of claim 1 wherein the one or more bisphenol di(meth)acrylate monomers have a molecular weight of greater than 450 g/mole.

5. The brightness enhancing film of claim 1 wherein the one or more (meth)acrylate diluents have a viscosity of less than 100 cps at 25° C.

6. The brightness enhancing film of claim 1 wherein the non-brominated polymerizable resin composition is free of components having three or more (meth)acrylate groups.

7. The brightness enhancing film of claim 1 wherein the preformed polymeric film has a thickness of less than or equal to about 1.5 mils.

8. The brightness enhancing film of claim 1 wherein the preformed polymeric film has a thickness of less than or equal to about 1 mil.

9. The brightness enhancing film of claim 1 wherein the non-brominated polymerizable resin composition is non-halogenated.

10. The brightness enhancing film of any of claim 1 wherein the polymerized microstructured surface is a prismatic structure having a distance between prism peaks of between 10 and 35 microns, and a prism height of between 5 and 18 microns.

11. An optical film having a polymerized microstructured surface, disposed on a preformed polymeric polyethylene terephthalate film and the polymerized microstructured surface is a reaction product of a non-brominated polymerizable resin composition comprising i) at least about 60 wt-% of one or more bisphenol di(meth) acrylate monomers selected from the group consisting of

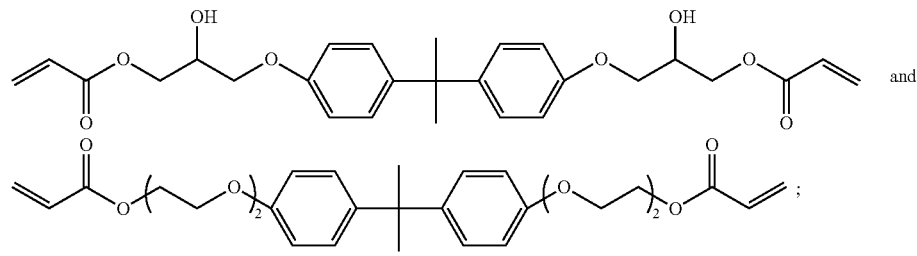

and a mixture of

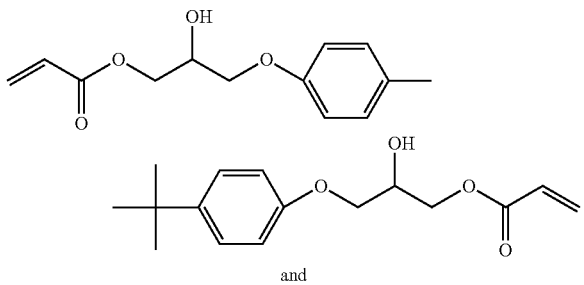

and

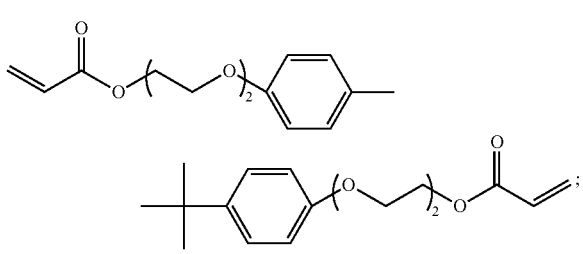

and ii) about 5 wt-% to about 40 wt-% of one or more (meth) acrylate diluents comprising having a viscosity of less than 300 cps at 25° C. selected from the group consisting of phenoxy ethyl acrylate, 2-phenyl-phenyl acrylate, tetraethylene glycol diacrylate and mixtures thereof; wherein the non-brominated polymerizable composition comprises 0 to 15 wt-% of components comprising three or more (meth)acrylate groups;

wherein the preformed polymeric polyethylene terephthalate film has a thickness of less than or equal to about 2.0 mil and the optical film exhibits curl from 0 mm to less than 2 mm.

* * * * *

UNITED STATES PATENT AND TRADEMARK OFFICE
CERTIFICATE OF CORRECTION

PATENT NO.        : 8,986,812 B2                                    Page 1 of 1
APPLICATION NO.   : 11/774976
DATED             : March 24, 2015
INVENTOR(S)       : Bryan Hunt It is certified that error appears in the above-identified patent and that said Letters Patent is hereby corrected as shown below:

Specification

Column 1
Line 51, Delete "thereof, and" and insert -- thereof; and --, therefor.

Column 5
Line 9, Delete "digycidyl" and insert -- diglycidyl --, therefor.

Column 6
Line 40, Delete "napthyl" and insert -- naphthyl --, therefor.

Column 13
Line 47, Delete "its" and insert -- it --, therefor.

Claims

Column 17
Line 62, In Claim 10, delete "any of claim" and insert -- claim --, therefor.

Column 17-18
Line 12-23, In Claim 11, after " 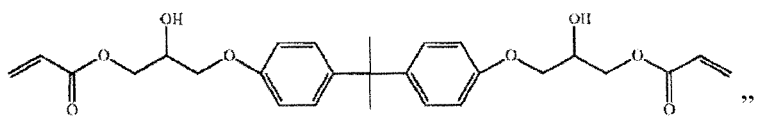 "

delete "and 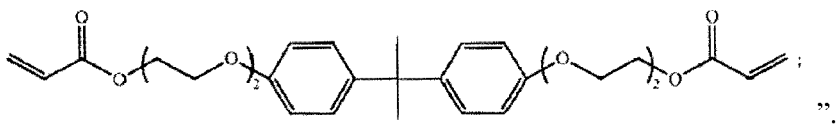 ".

Signed and Sealed this
Seventeenth Day of November, 2015

Michelle K. Lee
*Director of the United States Patent and Trademark Office*